US006627241B1

(12) United States Patent
DeMars et al.

(10) Patent No.: US 6,627,241 B1
(45) Date of Patent: Sep. 30, 2003

(54) APPARATUS AND METHOD FOR PROCESSING VISCOUS FOOD PRODUCTS

(75) Inventors: Jimmy A. DeMars, Hugo, MN (US); Gregory C. Vargas, White Bear Lake, MN (US); Robert F. Meyer, Maple Grove, MN (US); Michael A. Gattie, Murfreesboro, TN (US)

(73) Assignee: The Pillsbury Company, Minneapolis, MN (US)

( * ) Notice: Subject to any disclaimer, the term of this patent is extended or adjusted under 35 U.S.C. 154(b) by 37 days.

(21) Appl. No.: 10/108,018

(22) Filed: Mar. 27, 2002

(51) Int. Cl.[7] .............................. A21C 9/08; A23P 1/00
(52) U.S. Cl. ..................... 426/512; 99/450.7; 118/25; 118/313; 222/252; 222/330; 425/113; 425/308; 425/382 R; 426/516
(58) Field of Search ................... 426/512, 516, 426/518; 99/450.7; 118/25, 313, 314; 222/63, 221, 252, 330; 425/113, 308, 382 R

(56) References Cited

U.S. PATENT DOCUMENTS

| 2,165,963 | A |   | 7/1939  | Curtis            |
|-----------|---|---|---------|-------------------|
| 2,241,607 | A |   | 3/1941  | Long              |
| 3,013,650 | A |   | 12/1961 | Toby              |
| 4,347,646 | A |   | 9/1982  | Staudenrausch     |
| 4,503,995 | A | * | 3/1985  | Anderson ... 222/221 |
| 4,761,121 | A |   | 8/1988  | Battista et al.   |
| 4,898,526 | A |   | 2/1990  | Sakamaki et al.   |
| 4,929,152 | A |   | 5/1990  | Hermans           |
| 4,995,804 | A |   | 2/1991  | Hirabayashi       |
| 5,073,391 | A |   | 12/1991 | DeMars et al.     |
| 5,244,370 | A |   | 9/1993  | DeMars            |
| 5,445,674 | A |   | 8/1995  | DeMars            |
| 5,517,904 | A |   | 5/1996  | Vargas et al.     |
| 5,536,517 | A |   | 7/1996  | Hannaford         |
| 5,554,225 | A |   | 9/1996  | DeMars            |
| 5,624,696 | A |   | 4/1997  | Watanabe et al.   |
| 5,683,734 | A |   | 11/1997 | Israel            |
| 5,688,540 | A |   | 11/1997 | Hannaford         |
| 5,906,297 | A |   | 5/1999  | Cole              |
| 5,932,276 | A |   | 8/1999  | Bhatia et al.     |
| 5,975,374 | A |   | 11/1999 | Vargas et al.     |
| 6,290,483 | B1|   | 9/2001  | McIsaac et al.    |
| 6,405,643 | B1| * | 6/2002  | Moyses et al. ............ 99/450.7 |

FOREIGN PATENT DOCUMENTS

DE                 360131          9/1922

OTHER PUBLICATIONS

NuTec Manufacturing, Unknown Date, NuTec 745 product information; 2 pages.
Albert Handtmann, Unknown Date, Handtmann PA 30—7 product information; 2 pages.

* cited by examiner

Primary Examiner—George C. Yeung
(74) Attorney, Agent, or Firm—Michael C. Maier; Douglas J. Taylor; Karrie G. Weaver

(57) ABSTRACT

A food product depositor system utilizes a food product depositor device. Preferably, the food product depositor device includes at least one food product depositor module. In an embodiment, the food product depositor module may include mating features and a plurality of food product depositor modules may be assembled by the mating features to form the food product device. Preferably, the food product depositor module includes a supply port, a rotor positioned within a cavity, at least one sliding vane, and a discharge port. In an embodiment, the food product depositor module includes a cutoff device. Additionally, the present invention is also directed to methods of processing food products by way of such an apparatus.

33 Claims, 11 Drawing Sheets

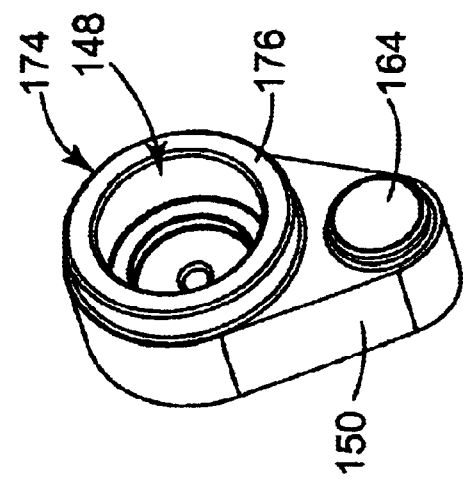
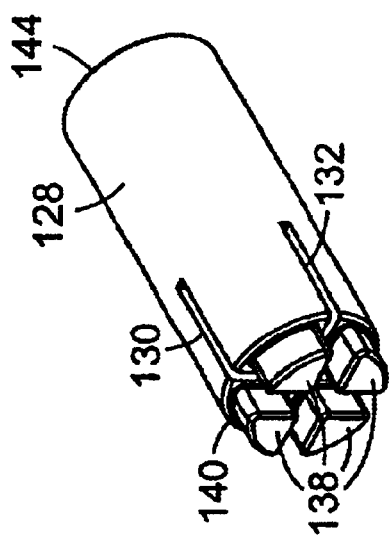
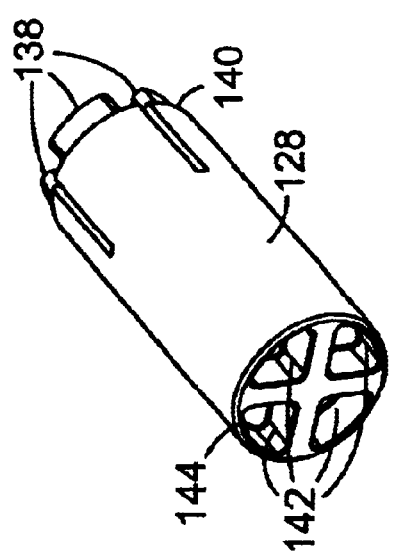

APPARATUS AND METHOD FOR PROCESSING VISCOUS FOOD PRODUCTS

TECHNICAL FIELD

The present invention relates to equipment that is suitable for depositing food product, such as for depositing viscous food products, and methods of depositing such food products. In particular, the present invention is directed to such a depositing apparatus and method of depositing where a viscous food product is portioned, shaped, and dispensed.

BACKGROUND OF THE INVENTION

Food product manufacturers frequently introduce new food products in order to satisfy consumers and maintain a competitive position in the marketplace. New food products may be old products with a new feature or they may be combinations of old products or they may be entirely new products altogether. In order for manufacturers to remain competitive they should use economical manufacturing techniques and smart processing methods.

Development of food processing equipment often is directed to performing similar tasks that previous equipment performed but at higher production throughput rates and/or with greater efficiency. Generally, manufacturing methods are designed that are smarter, i.e. that sense or monitor the product or the process conducted in order to improve overall quality and consistency of the food product. Further, it is desirable for the corresponding processing equipment to become more economical. As an additional challenge, food product processing equipment may be designed to integrate multiple tasks in place of individual tasks that were performed by existing equipment in combination with one another.

Food product depositors have been developed for intermittently or continuously depositing food product onto a moving surface of either another food product, packaging material, or a conveyor. Also, depositors are known which divide a single stream of flowable food product, such as supplied by a common feed manifold, into multiple streams that are disposed and carried away by a conveyor system. These food product streams may be later cut with a mechanically driven knife or other suitable means so that the combination of the food processing and dispensing machine, the conveyor belt, and the cutting means provides a plurality of substantially equal portions of the food product.

In general, viscous food product processing equipment has become better suited to meet the throughput and cost needs of the food product industry. One such food product depositor is disclosed in U.S. Pat. No. 5,975,374 to Vargas et al., which is commonly assigned to the assignee of the present invention and the disclosure of which is entirely incorporated herein by reference. Disclosed in the Vargas et al. patent is a depositor apparatus for dispensing measured units of material onto a conveyor system. The depositor apparatus includes two dispensing assemblies that are fed from a common feed device through individual feed inlets. The dispensing assemblies have dispensing chambers with spaced apart dispensing outlets. The depositor apparatus also includes a diverting apparatus for opening and closing the feed inlets for the purpose of filling the dispensing chambers in between alternating dispensing cycles. Thus, the intermittent depositing assemblies reciprocally operate to alternately dispense material. As a result the overall efficiency of the depositing operation is increased.

Another food product depositor is disclosed in U.S. Pat. No. 5,688,540 to Hannaford. This apparatus provides positive displacement synchronized metering of pressurized food material to a plurality of extrusion dies using several positive displacement metering apparatus. The Hannaford device provides a continuous food extrusion process having an equal flow of material from a number of dies which are fed from the same source. Thus, multi-lane continuous uniform streams of food product can be provided. Further, multiple streams of food product can be provided onto a conveyor system for delivery to a separate cutting system thereby providing fixed portions of a food product at greater throughputs. That is, by using multiple outlets for the continuous streams of food product, throughput is increased.

Yet another multi-lane depositor is disclosed in U.S. Pat No. 5,906,297 to Cole. Disclosed in the Cole patent is a multilane depositor for providing continuous streams of food product. More specifically, this apparatus divides one or more streams of fluid material into a plurality of substantially proportional segments. That is, the invention of Cole uses a multi-outlet depositor to deposit proportional amounts of material.

Yet another example of a depositor is disclosed in U.S. Pat No. 5,445,674 to DeMars, which is commonly assigned to the assignee of the present invention and the disclosure of which is entirely incorporated herein by reference. Disclosed in the DeMars patent is a fluid dispenser for consistently depositing relatively thick and lumpy materials. The depositor utilizes a supply path to pump/valve combinations and a feedback pressure line to assure an adequate pressure at the point of deposit. There are positive displacement pumps that operate continuously through the valves with an additional feedback path to assure constant flow of the material.

In general, the processing equipment described above is directed to metering and dispensing material, usually onto a conveyor surface. Also, such prior art processing equipment is usable to divide a single stream of food product into multiple streams that are carried away by a conveyor system. These streams of food product are later cut by a suitable means for defining food product portions so that the combination of the food processing machine, a conveyor belt, and a cutting means provides a plurality of substantially equal portions of the food product.

Although the devices and systems of the prior art have provided equipment for improved food product processing, there still remains a need for even faster, and more so, smarter food product processing equipment. As mentioned above, one such way for food product processing equipment to become smarter is for it to become more integrated. Processing equipment is generally more efficient and cost effective when several processing steps can be performed with the same piece of processing equipment.

SUMMARY OF THE PRESENT INVENTION

The present invention is directed to methods and apparatus for depositing generally viscous food products. Preferably, a depositor module includes mating features for assembling a plurality of depositor modules in line to form a multi-lane depositor device. A preferred depositor module minimizes changes to the cross-sectional shape of the fluid stream within the depositor body. Such minimized change to the cross-sectional shape of the food product flow stream is advantageous in that it provides for lower rotational power requirements such as for highly viscous materials and especially for materials that are dilatant in their rheological characteristics. As an additional advantage minimized cross-sectional change to the flow stream allows for rapid and highly controlled acceleration and deceleration of the rotor and sliding vanes which provides for greater control over deposited food products. Moreover greater processing speeds may be realized where changes to the cross-sectional shape of the fluid stream are minimized. As a further advantage, damage to food product particulates such as those particulates described below, may be reduced where changes to the cross-sectional shape of the fluid stream are minimized. Also, the food product may be shaped within the depositor body such that no additional shaping of the deposited food product is required.

In an aspect of the present invention a depositor module for depositing viscous food product is provided. Preferably, the depositor module includes a depositor body having an internal chamber which has an inside surface, a rotor rotatably positioned within the chamber of the depositor body and which rotor has an outside surface, and at least one sliding vane passing through the rotor. In accordance with the present invention the rotor preferably has a rotational position wherein a portion of a sliding vane extends past the outside surface of the rotor into the chamber and is at least partially determined by the inside surface of the chamber.

The preferred depositor module also includes a supply port fluidly connected to the chamber, a discharge port fluidly connected to the chamber, and a shaping region positioned between the supply port and the discharge port. Preferably, the shaping region is defined by at least a portion of the outside surface of the rotor and at least a portion of the inside surface of the chamber. More preferably, the cross-sectional shape of the shaping region generally corresponds to the portion of the sliding vane extending past the outside surface of the rotor between a first rotary position of the rotor and vane and a second rotary position of the rotor and vane.

In another aspect of the present invention the food product depositor module may include a cutoff device for certain applications for interrupting the flow of food product being deposited by the food product depositor. In particular the cutoff device is preferably a rotary spool type cutoff device which includes a passage that may be controllably aligned and misaligned with the passage of the depositor module to sever the food product stream.

In yet a further aspect of the present invention a food product depositor module for use in a multi-lane depositor system with another food product depositor module having similar features is provided. Preferably, the food product depositor includes a first depositor body having a first mating feature at a first end of the depositor body and a second mating feature at a second end of the depositor body. The second mating feature is preferably provided for mating with a first mating feature of another depositor module similar to the first depositor module. The depositor module also preferably includes a rotor positioned within a chamber of the depositor body and at least one sliding vane passing through the rotor. The depositor module also preferably includes a supply port fluidly connected to the chamber, a discharge port fluidly connected to the chamber, and a shaping region positioned between the supply port and the discharge port.

A method for depositing a predetermined amount of food product in accordance with the present invention is characterized by including the steps of providing at least one food product depositor module, supplying viscous food product to a supply port of the food product depositor, filling at least a portion of a shaping region with food product from the supply port, transferring food product through the shaping region by rotating a rotor and sliding vane by a rotational amount generally corresponding to the predetermined amount of food product to be deposited while substantially maintaining the cross-sectional shape of the food product, and depositing the predetermined amount of food product through a discharge port.

These and other features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

The accompanying drawings, which are incorporated in and constitute a part of this specification, illustrate several aspects of the invention and together with the description of the preferred embodiments, serve to explain the principles of the invention. A brief description of the drawings is as follows:

FIG. 7 is a perspective view of a rotor in accordance with the present invention showing male coupling features at a drive end thereof;

FIG. 8 is a perspective view of the rotor of FIG. 7 showing female coupling features at a receiving end thereof;

FIG. 9 is a perspective view of a depositor body end cap in accordance with the present invention showing a recess for a rotor end cap and also showing an opening for a cutoff device;

DETAILED DESCRIPTION OF THE PREFERRED EMBODIMENTS

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
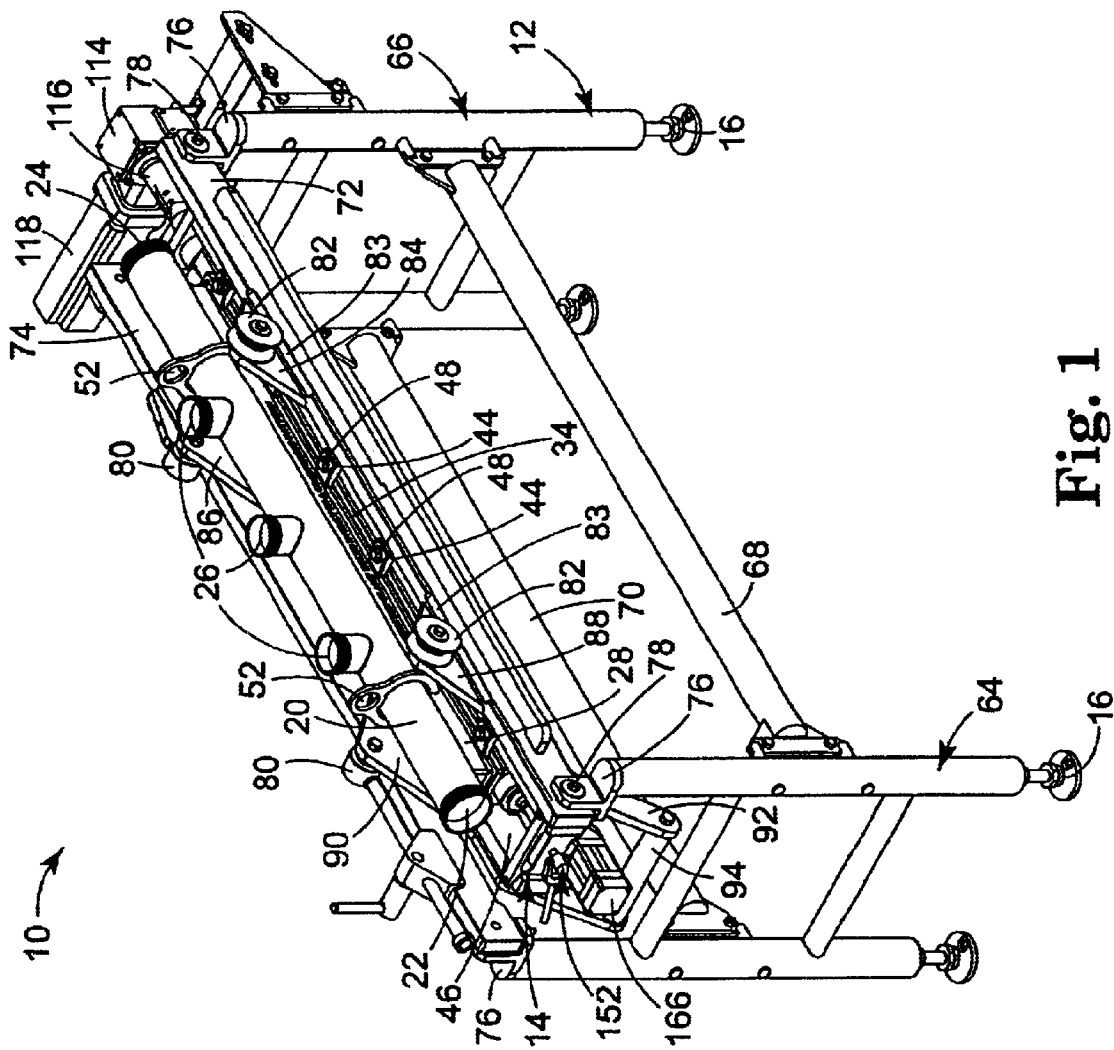
FIG. 1 is a perspective view of a multilane food product depositor system in accordance with the present invention showing a depositor device supported on and positioned by a frame and showing a feed device for the depositor device.
Figure 2:
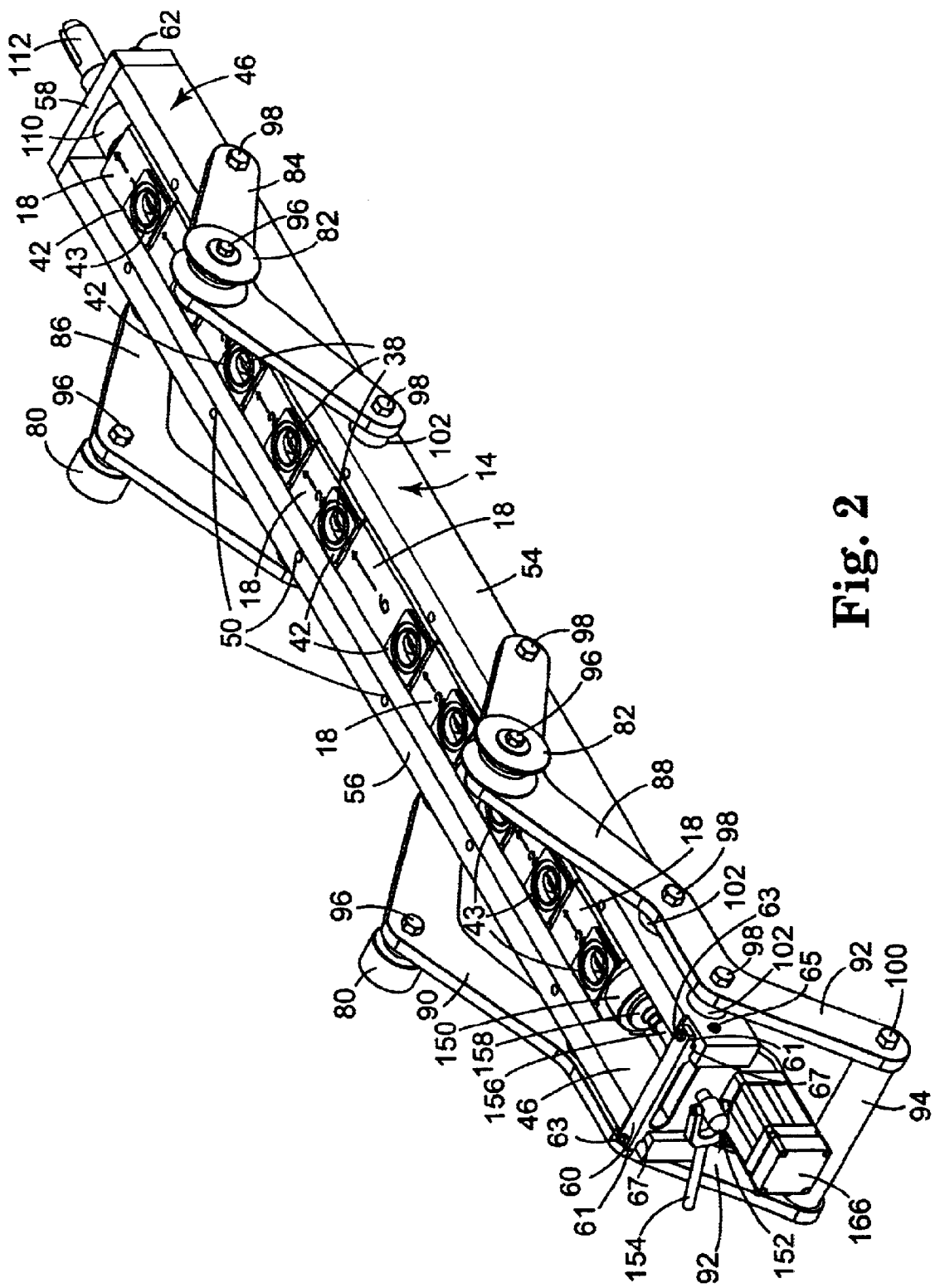
FIG. 2 is a perspective view of the depositor device of FIG. 1 showing a plurality of depositor modules and also showing brackets for mounting the depositor device to the frame shown in FIG. 1.

Referring to FIG. 1 of the drawings, there is shown a multilane food product depositor system 10 made in accordance with and embodying the principles of the present invention. The depositor system 10 preferably includes a floor-standing support frame 12 for supporting and positioning a depositor device 14 above a food product receiving conveyor (not shown) that would pass through support frame 12 below depositor device 14. As is described below, the depositor device 14 is preferably a multilane depositor device having a plurality of food product depositor modules 18 arranged in line with one another and supported over a food product receiving conveyor (not shown) across its direction of conveyance and as are shown in FIG. 2 and are described in greater detail below. A food product receiving conveyor (not shown) may comprise a conventional or developed moving belt, mesh, or the like or series of movable units, or may comprise movable packaging material or other food product provided as individual units or products or as continuous webs or sheets comprising any number of layers. Such packaging material or food product may itself be conveyed by any known or developed technique or other conventional or developed conveying mechanisms may be used to move such material or food product in a conveyance direction.

Referring to FIG. 1, the support frame 12 preferably includes a first end frame structure 64 comprising vertical and horizontal elements and a second end frame structure 66 also comprising vertical and horizontal elements. Also, the support frame 12 preferably includes a first side frame element 68 and a second side frame element 70 for attachment between the end frame structures 64 and 66 by any conventional manner and to provide spacing and support structure below where a food product receiving conveyor (not shown) is to run. The support frame 12 preferably also includes a first upper beam 72 and a second upper beam 74 for positioning and supporting the depositor device 14 as described below. Preferably, the beams 72 and 74 are substantially parallel and are attached to the end frame structures 64 and 66 by using brackets 76 and conventional fasteners 78 as is illustrated in FIG. 1.

Referring to FIGS. 1 and 2 a preferred technique for attaching the depositor device 14 to the support frame 12 and for providing additional positional adjustment of the depositor device 14 will be described. Preferably, the depositor device 14 includes a frame 46 for supporting and positioning a plurality of depositor modules 18 as is described below. As shown in FIG. 2, the frame 46 preferably has a first side section 54 and a second side section 56 which are substantially parallel. The frame 46 further includes a first end section 58 and a second end section 60. The end section 58 is mechanically attached to ends of the first and second side sections 54 and 56 respectively for spacing the first and second side sections 54 and 56 from one another. Preferably, the side sections 54 and 56 and the end sections 58 are secured using conventional fasteners 62 or the like. Preferably, end section 60 is movably mounted with respect to the side sections 54 and 56 within transverse slots 67. One such slot 67 in side section 56 can best be seen in FIG. 6. The slot 67 in side section 58 is similar. The end section 60 fits between the other ends of side sections 54 and 56 to maintain proper spacing thereof, but preferably slidably floats within the slots 67 of side sections 54 and 56.

Figure 6:
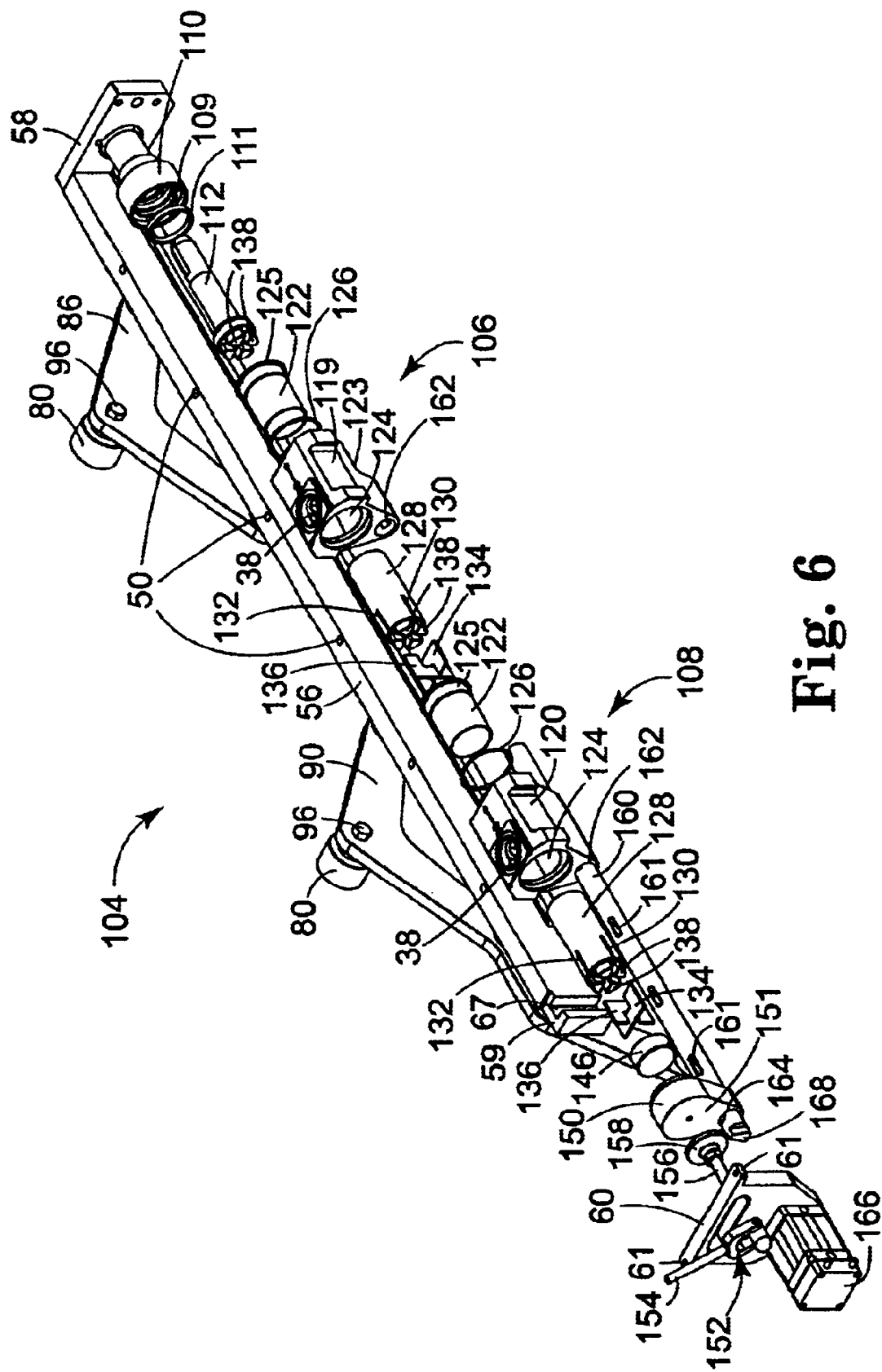
FIG. 6 is a partial perspective view of a depositor device in accordance with the present invention having two depositor modules.

Preferably, the end section 60 is adjustably positionable with respect to the side sections 54 and 56. As shown in FIG. 2, leveling screws 63 are provided for leveling the end section 60 in a generally up and down direction. Referring to both FIGS. 2 and 6, the end section 60 preferably has a lip 61 on each side through which the leveling screws 61 may pass. Each of the side sections 54 and 56 preferably has a surface 59 which is best seen in FIG. 6 and which supports the leveling screws 63. Adjustment of the leveling screws 63 may thus adjustably positions the lip 61 with respect to the surface 59 thereby providing adjustable positionability of the end section 60. It is understood that such positioning and alignment may be accomplished by using shims or other suitable mechanical means such as with the use of springs to positively position the end section 60. Also, alignment screws 65 are provided for adjusting the end section 60 in a generally left and right direction. Only one alignment screw 65 is shown in FIG. 2 on side section 54 and which passes through side section 54. There is also a similar alignment screw on the side section 56. The alignment screws 65 generally oppose each other and may position the end section 60 by moving in and out accordingly. That is, where side section 60 is generally horizontally centered each of the alignment screws 65 would extend from the side sections 54 and 56 respectively by about an equal amount. As above, such horizontal positioning and alignment may be accomplished by using springs and other suitable mechanical means. It is understood that the frame 46 may be any structure or device such that the functional aspects of the present invention are accomplished. That is, the frame may be formed as a single part or may be formed from any number of multiple parts in accordance with the present invention.

The frame 46 preferably includes means for supporting and positioning the depositor device 14 with respect to the support frame 12. Preferably, the depositor device 14 includes a plurality of spaced wheels 80 operatively attached with side section 56 of frame 46 and a plurality of spaced grooved wheels 82 operatively attached with side section 54 of frame 46 as shown in FIGS. 1 and 2. Preferably, the wheels 80 and grooved wheels 82 are attached to the side sections 54 and 56 by brackets 84, 86, 88, and 90. Brackets 88 and 90 differ from brackets 84 and 86 in that brackets 88 and 90 each include an extension 92 thereof between which a handle 94 is preferably attached by using fasteners 100. The handle 94 may be used to assist in positioning the depositor device 14. Preferably, fastener pins 96 are used to attach the wheels 80 and the grooved wheels 82 to the brackets 84, 86, 88, and 90, respectively, as illustrated in FIG. 2, so that each of wheels 80 and grooved wheels 82 are rotatable about its fastener pin 96. Brackets 84, 86, 88, and 90 are secured to the side sections 54 and 56, such as by conventional bolts 98 or any other conventional manner. Also, as can be seen in FIG. 2, the brackets 84, 86, 88, and 90 are preferably spaced away from the side sections 54 and 56 by using standoffs 102.

Referring to FIG. 1, the frame 46 is preferably supported by frame 12. Preferably, the grooved wheels 82 are grooved in order to trackingly ride on rails 83, which rails are preferably part of the top surface of frame member 70. Also, wheels 80 ride on the top surface of frame member 74. The rails 83 preferably limit movement of the depositor device 14 in the conveyance direction. The grooved wheels 82 and wheels 80 allow for positional adjustment of the depositor device 14 across the conveyance direction such that the output of the depositor modules 18 may be positioned with respect to the conveyor. For example, the position of the depositor device 14 may be set to correspond with an item carried by the conveyor such as a tray, or food product or the like. Where such movement is not needed or desired, such wheels 80 and 82 may comprise other bearing members or may be eliminated. In any case, any other mounting technique whether facilitating movement or not can be used instead.

The frame 12 preferably includes position adjustment means for leveling and providing fine adjustment of the position of the depositor device 14 with respect to a food product receiving conveyor (not shown). It is contemplated that the food product receiving conveyor (not shown) may carry receiving devices such as trays or containers. It is further understood that the food product receiving conveyor (not shown) may be combined with other process steps such as providing a sheet of dough product for receiving food product material from the depositor device 14.

In a preferred embodiment illustrated in FIG. 1, conventionally known adjustable feet 16 are preferably attached to the frame 14 and used as the position adjustment means introduced above. It is understood that course adjustment of the position of the depositor device 14 may be accomplished through appropriate design and configuration of the frame 12 for the particular receiving conveyor (not shown) to be utilized. It is understood that any technique for supporting and positioning the depositor device 14 may be used such that the functional aspects of the present invention are realized. For example, the depositor device 14 may be operatively incorporated with a receiving conveyor such as a conventionally known endless conveyor so that a common frame support structure is utilized for both the conveyor and depositor device 14.

Further referring to FIG. 1, the depositor device 14 preferably includes a supply manifold 20 for receiving food product from a food product source or feed device (not shown). In accordance with the present invention, the depositor modules 18, described below, are particularly well suited for portioning and dispensing viscous food product. Viscous food product as used throughout this application are meant to include all types of food product that are generally flowable such as scrambled eggs, icings, as well as food products including particulates such as nuts, meats, peppers, onions, and other vegetables, and the like. Some examples of such viscous food products are disclosed in U.S. Pat. No. 5,932,276 to Bhatia et al., and entitled "Low Water Activity Egg Product," and which is commonly assigned to the assignee of the present invention and the disclosure of which is entirely incorporated herein by reference. Other less viscous food product may also be dispensed in accordance with the present invention. The food product feed device may be any known or developed feed device such as the feed device disclosed in U.S. Pat. No. 5,975,374 to Vargas et al., which is commonly assigned to the assignee of the present invention and the disclosure of which is entirely incorporated herein by reference.

As shown in FIG. 1, the supply manifold 20 is preferably a multi-port tube and includes at least one feed port (described below) for connection to a feed device (not shown). Preferably, the supply manifold 20 includes one or more openings (not shown) for allowing food product to pass to a distribution manifold 28 as described below. As shown in FIG. 1, a first primary feed port 22 and a second primary feed port 24 are positioned at each end of the supply manifold 20, respectively. Also, as is shown in FIG. 1, auxiliary feed ports 26 are positioned on the supply manifold 20 at intermediate locations for providing an additional supply of food product to the supply manifold 20. Generally, more auxiliary feed ports 26 are desirable where the length of the supply manifold 20 increases. That is, where food product is provided to the supply manifold 20 from either or both of the primary feed ports 22 and/or 24, the pressure of the food product at a distance of the supply manifold away from the primary feed may become too low to effectively supply the depositor modules 18 at that distance of the depositor device 14. As such, auxiliary food product feed ports 26 may be used as needed as determined by empirical means or as determined based upon flow dynamics. In general, the provision of feed ports can be based largely upon the delivery of food product at an effective minimal pressure to fill manifold feed cavities of depositor modules 18, as described in greater detail below. It is understood that any combination of feed ports 22, 24, and 26 may be used such that the functional aspects of the present invention are realized. For example, primary feed port 22 may be used alone while feed ports 24 and 26 are operatively closed such as by utilizing a cap, valve or deflector or the like. Further, food product may be supplied to all of the feed ports 22, 24, and 26 simultaneously.

Figure 3:
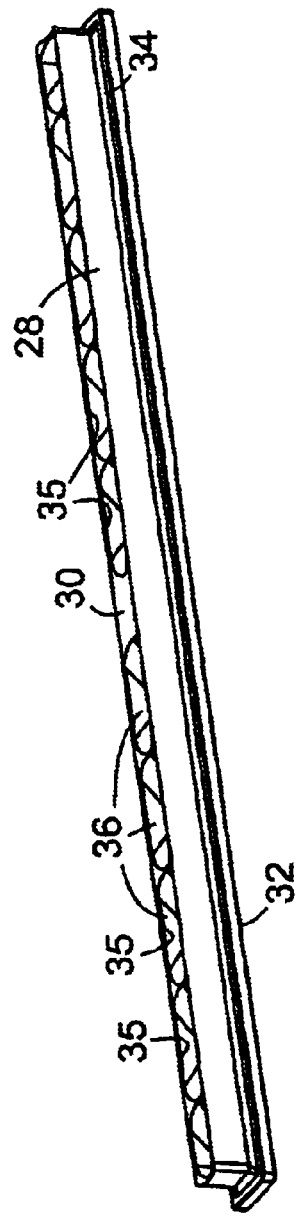
FIG. 3 is a perspective view of a distribution manifold in accordance with the present invention showing conical openings for guiding food product to plural depositor modules.
Figure 4:
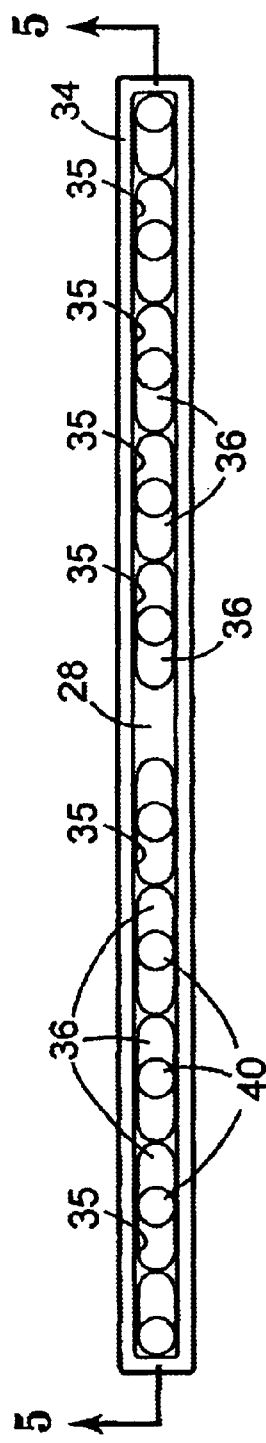
FIG. 4 is a top view of the distribution manifold of FIG. 3 showing the conical openings that feed to mating ports for mating with supply ports of the depositor modules.

Further referring to FIG. 1, the supply manifold 20 is operatively associated with the distribution manifold 28 that is positioned next to the supply manifold 20 for dividing the food product provided by the supply manifold 20 into individual streams to be supplied to the individual depositor modules 18. The distribution manifold 28 is shown in greater detail in FIGS. 3–5. In FIG. 3, the distribution manifold 28 is shown in perspective view. In FIG. 4, a top view of the distribution manifold 28 is illustrated. Also, in FIG. 5 a section view of the distribution manifold 28 is shown. As can be seen in FIG. 3 the distribution manifold 28 includes a top surface 30 which is preferably welded or otherwise mounted to a similar bottom surface of the supply manifold 20 to create a feed combination such as is illustrated in FIG. 1. Preferably, the bottom of the supply manifold includes one or more openings (not shown) in registration with (or at least in partial communication with) openings 35 of top surface 30 of distribution manifold 28.

Preferably, the openings 35 of the distribution manifold 28 lead to a plurality of conical passages 36 for guiding food product. The conical passages 36 further lead to mating ports 40, the purpose of which is for providing flowable food product communication with each of the depositor modules 18 as described below. In a preferred embodiment, the conical passages 36 and mating ports 40 of the distribution manifold 28 are positioned to correspond with and mate to supply ports 38 of each of the depositor modules 18 of the depositor device 14 as can be seen in FIG. 2. It is understood that the combination of the distribution manifold 28 and the supply manifold 20 may be any such device either known or future developed for providing a supply of food product material to the depositor modules 18 of the depositor device 14 in accordance with the functional aspects of the present invention. It is further understood that the distribution manifold 28 and the supply manifold 20 may be configured so that different food products may be fed to the supply ports of each of the depositor modules 18. That is, a single depositor module or a plurality of depositor modules may have their own distribution manifold and supply manifold in accordance with the present invention.

Figure 5:
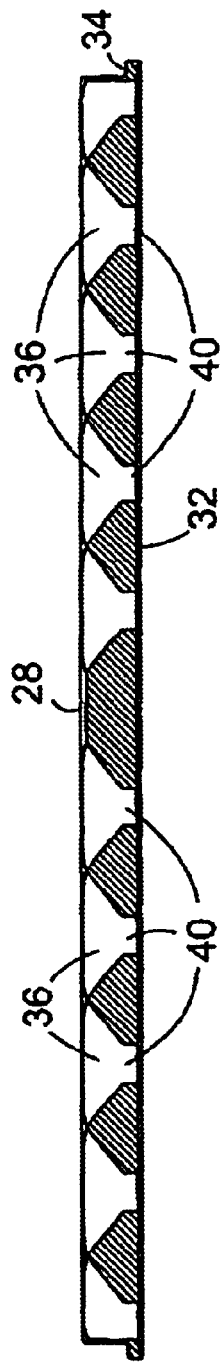
FIG. 5 is a cross-sectional side view taken along line 5—5 of the distribution manifold of FIG. 4 showing the conical openings and mating ports.

Referring to FIGS. 3–5 the distribution manifold 28 has a bottom surface 32 and a lip 34 for attaching to the depositor device 14. The lip 34, as can be seen in FIG. 1, is preferably used to secure the bottom surface 32 to a top surface 42 (or a combination of such surfaces 42 of plural depositor modules 18) of the depositor modules 18 of the depositor device 14. Preferably, each depositor module 18 includes a seal groove 43 for retaining a seal (not shown) such as an o-ring or the like for enhancing fluid communication between mating ports 40 and supply ports 38. Preferably, as shown in FIG. 1, clamps 44 engage the lip 34 and thereby secure the distribution manifold 28 to the depositor device 14 and form a seal between the bottom surface 32 of the distribution manifold 28 and the top surface 42 of each depositor module 18. As can been seen in FIG. 1, preferably the clamps 44 are attached to frame 46 of the depositor device 14 by using bolts 48 that are attached by using threaded holes 50 spaced along the frame 46. Further referring to FIG. 1, the depositor device 14 preferably includes a lifting means such as the lifting eyes 52 shown in FIG. 1 for facilitating the assembly and positioning of the supply manifold 20, the depositor device 14 with the frame 12.

In FIG. 6, a partial exploded view of a depositor device 104 in accordance with the present invention is illustrated having a first depositor module 106 and a second depositor module 108. It is understood that any number of depositor modules 18 may be assembled to form the depositor device 104 such that the functional aspects of the present invention are realized and depending on specific applications. In a preferred embodiment, such as is illustrated in FIG. 2, the depositor device 14 includes ten depositor modules 18. It is further understood that each lane may have the same food product or that each lane may have different food products.

As shown in FIG. 6, the depositor device 104 preferably includes a drive shaft bearing assembly 110 which may be non-rotationally supported within an opening of the end section 58 and that includes a rotary bearing 109 and cup seal or o-ring 111 for rotationally supporting and providing a seal between the drive shaft 112 and the bearing assembly 110. The bearing assembly 110 preferably permits axial movement of the drive shaft 112 as it is positioned within an internal passage of the bearing assembly 110 to extend through the end wall 58 and to be drivingly engaged. The bearing assembly 110 is illustrated in its preferred position in FIG. 2 extending itself through the end wall 58 and with the end of drive shaft 112 extending further to be drivingly engaged. Preferably, as can be seen in FIG. 1, the drive shaft 112 is connected to a gearbox 114 by a drive coupling 116. Further, the gearbox 114 is preferably connected to a motor 118 and is connected in any conventional manner to convert and control drive shaft speed based upon motor rotational speed. The motor 118 may be any rotational drive device and may also be connected to a control system (not shown) for determining speed and actuation timing based upon any number of process parameters.

Figure 10:
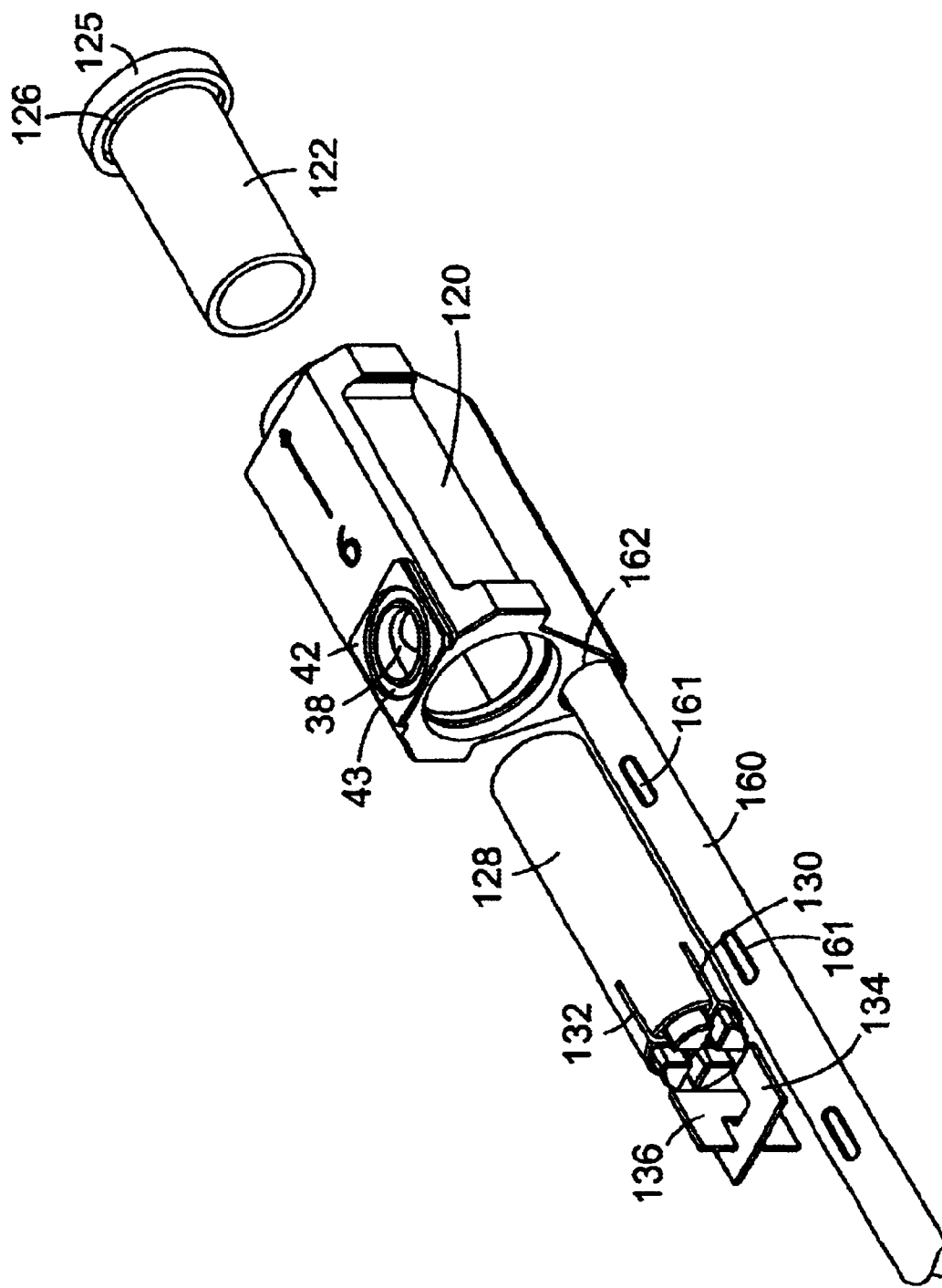
FIG. 10 is a partial exploded perspective view of a depositor module in accordance with the present invention showing a depositor body, a rotor, a pair of sliding vanes, a rotor bearing sleeve, and a cutoff device.

Further referring to FIG. 6 and also to FIG. 10, each depositor device 106 and 108 preferably includes a depositor body 120 and 119 respectively. A more detailed description of the depositor body 120 and its functional aspects is provided below. Also, the depositor body 119 is substantially identical to the depositor body 120 except that it includes a recessed region 123, the function of which is described below. Preferably, the depositor body 120 (and 119 hereinafter) includes a sleeve 122 that is positioned within a passage 124 of the depositor body 120. Preferably, an o-ring seal 126 is used to seal a head 125 of the sleeve 122 to the depositor body 120. The sleeve 122 preferably functions as a bearing for a rotor 128.

The rotor 128 is shown in greater detail in FIGS. 7 and 8. Preferably, the rotor 128 includes a first slot 130 and a second slot 132 for positioning and guiding a first vane 134 and a second vane 136 respectively as is described in more detail below. In a preferred embodiment, the first vane 134 and the second vane 136 are positioned perpendicularly to each other. Preferably such rotors 128 are formed from a polymeric material which material preferably minimally absorbs water. Such suitable materials include but are not limited to Teflon and Delrin and similar polymers. Preferably, the vanes are formed from stainless steel. It is understood that any number of sliding vanes may be used such that the functional aspects of the present invention are accomplished. Slots 130 and 132 also preferably intersect and are sized to permit each of vanes 134 and 136 to slidingly move freely from side to side as limited by the cut-outs of the sliding vanes 134 and 136. Sliding vanes themselves are well known where such vanes can intersect one another at such cut-outs and as guided within intersecting slots. The extent of the cut-out for each vane in the direction of vane extension determines the degree of sliding movement of that vane within its slot. The other vane limits further movement. As shown in FIG. 6, vanes 134 and 136 preferably cross each other with their cut-outs engaged so as to fit within intersecting slots 130 and 132, respectively. Moreover, the length of each vane 134 and 136 is longer than the slots 130 and 132 (and the diameter of the rotor 128) so that their sliding movement can be controlled by engagement with control surfaces described below.

Referring to FIG. 7, each rotor 128 preferably includes a plurality of male coupling features 138 positioned at a drive end 140 of the rotor 128. Note that the drive shaft 112 also includes a plurality of preferably similar male coupling features 138. Referring to FIG. 8, each rotor 128 preferably includes a plurality of female coupling features 142 at a receiving end 144 of the rotor 128.

In a preferred embodiment, the male coupling features 138 of one or more rotors 128 may engage with the female coupling features 142 of one or more rotors 128 to form an interlinked assembly of rotors 128 which may be commonly driven by the drive shaft 112. That is, referring to FIG. 6, male coupling features 138 of the drive shaft 112 preferably couple to and engage with the female mating features 142 (not shown in FIG. 6 but see FIG. 8) of the rotor 128 of the depositor module 106. Further referring to FIG. 6, male coupling features 138 of the rotor 128 of depositor module 106 preferably engage with the female mating features 142 (not shown in FIG. 6 but see FIG. 8) of the rotor 128 of the depositor module 108. Again referring to FIG. 6, the male coupling features 138 of the rotor 128 of depositor module 106 are preferably engaged with a rotor endcap 146 which may be rotatably positioned within a recess 148 (see FIG. 9) of a depositor body endcap 150. A specific advantage of such modular structure is that any number of depositor modules 18 can be assembled to form a multi-lane arrangement. It is understood that single lane arrangement may be used.

Further referring to FIG. 6, the depositor device 104 preferably includes the rotor end cap 146 for terminating the drive end 140 (see FIG. 7) of a rotor 128 which will not be engaged with the driven end 144 (see FIG. 7) of another rotor 128. That is, the last rotor 128 in an assembly of a plurality of rotors 128 is preferably terminated with the end cap 146. As illustrated in FIG. 6, the end cap 146 terminates the rotor 128 of the depositor module 108. Also as shown in FIG. 6, the depositor device 104 preferably includes the depositor body end cap 150 for terminating the last depositor body 120 in an assembly of a plurality of inline depositor modules such as the depositor modules 106 and 108 of the depositor device 104. As is shown in FIG. 6, the depositor body end cap 150 terminates the depositor body 120 of the depositor module 108. Preferably, as can be seen in FIG. 9, the depositor body end cap 150 has the recess 148 for rotatably receiving the end cap 146 that rotates with the assembly of rotors 128 and drive shaft 112 as described above.

In FIG. 6, a clamping device 152 is illustrated as part of the depositor device 104 in order to support the non-driven side of the assembly of rotors 128 and drive shaft 112. Preferably, the clamping device 152 includes a handle 154 attached to a threaded shaft 156 which passes through a threaded hole provided through the end section 60 of frame 46 of the depositor device 104. Further, the clamping device 152 includes a plate 158 attached to the threaded shaft 156 so as to move axially with the shaft 156. Thus, the clamping device 152 can be used by the threaded shaft 156, such as by handle 154, so as to move the plate 158 into engagement with the side surface 151 of depositor body end cap 150. As such, a compressive force tends to hold the depositor body 120 against each successive depositor body and to support the non-driven end of the assembly in position. Also, such a clamp mechanism 152 permits the use thereof with any number of depositor modules 18. A detailed description of the manner in which the depositor modules fit together is presented below.

Also shown in FIGS. 6 and 10 is a cutoff device 160. Preferably, the cutoff device 160 includes a passage 161 that corresponds to each depositor module 18 for allowing food product to pass through the cutoff device 160 and which is described in detail below. Preferably, the cutoff device 160 is provided through a passage 162 in each of the depositor bodies 120 of the depositor modules in line, such as 106 and 108. Also, the cutoff device preferably passes through an opening 164 provided through the depositor body end cap 150 (see FIG. 9). Passages 162 provide bearing support for rotary motion of the cutoff device 162. Also as shown in FIG. 6, the depositor device 104 preferably includes a motor 166 having an output shaft (not shown) that is attached to a drive end 168 of the cutoff device 160 by a conventional coupling device (not shown). Further, the motor 166 may be connected to a control system (not shown) so as to control speed and actuation timing for rotating cutoff device 160 for selective alignment of passages 161 to permit food product dispensing as described in greater detail below. In accordance with the present invention, the cutoff device 160 may be used to selectively interrupt a stream of food product material as is also described in greater detail below. The motor 166 can comprise any known or developed rotary drive device, and preferably comprises a servo-motor, such as commercially available from Turn-Act Company of Louisville, Ky. and which motor selectively rotates cutoff device 160 in both rotational directions to controllably align and misalign passages 161 for food product passage. It is understood that the cutoff device 160 may be any known or developed device that may be used to interrupt a stream of food product, for example, the cutoff device may comprise a wire knife, air knife, rotary spool device, ultrasonic knife, iris, guillotine or combinations thereof.

Alternatively, the cut off device 160 can be merely rotated in one direction where alignment would occur every 180° of rotation. In any case, it is preferable to time the cut off device 160 with the rotary motion of rotors 128 so that dispensing can be controlled according to a specific application. Such timing can result by the use of appropriate position sensors as are well known regarding rotary components with an electronic control system that can be microprocessor or circuit based or by mechanical timing mechanisms, such as utilizing timing gears and/or chains, belts and the like. For certain applications, such as less viscous or runnier foods, a cut-off device is preferred so as to cleanly stop food product dispensing. For many food products though, such a cut-off device is not needed because the food product tends to maintain its portion integrity as it is dispensed.

Figure 12:
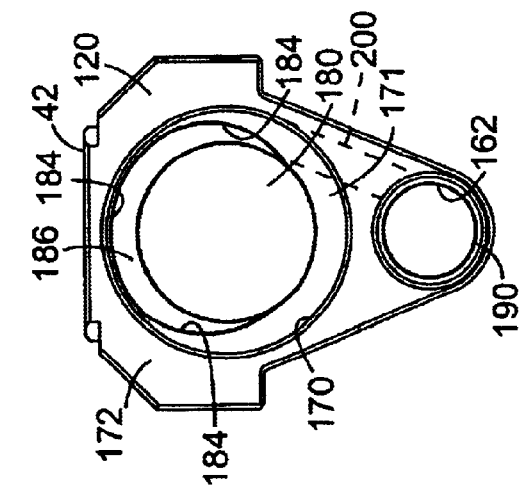
FIG. 12 is a front view of the depositor body of FIG. 11 showing a passage for a rotor and an enlarged generally concentric region for creating a chamber that in part defines the shape of a food product to be dispensed in accordance with the present invention.
Figure 13:
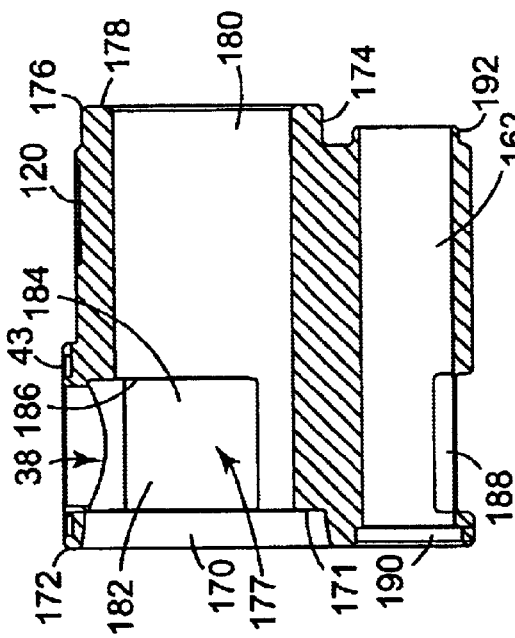
FIG. 13 is a cross-sectional view of the depositor body of FIG. 11 showing mating features for assembling a plurality of depositor bodies in line and a passage for a cutoff device in accordance with the present invention.
Figure 11:
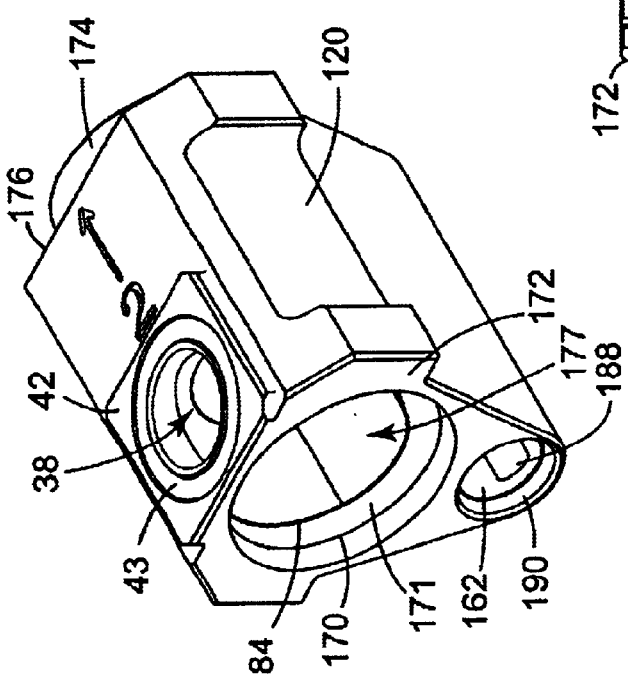
FIG. 11 is a perspective view of a depositor body in accordance with the present invention showing in particular a supply port for supplying food product to the depositor body.

In FIGS. 11, 12, and 13 the depositor body 120 described above is illustrated. In FIG. 11 a perspective view of the depositor body 120 is shown. In FIG. 12 a front view of the depositor body 120 is shown and in FIG. 13 a cross-sectional view of the depositor body 120 is illustrated. As shown in FIG. 11, the depositor body 120 preferably includes the supply port 38 described above leading to an internal cavity, which cavity is described below. Passage 162 for providing a rotary bearing surface is also shown for supporting the cutoff device 160.

As can be seen in FIGS. 11 and 13, the depositor body 120 preferably includes a first mating feature 170 on a first end 172 thereof. Preferably, the first mating feature 170 is a substantially circular recessed region having a diameter and depth generally corresponding to a diameter and depth of a second mating feature 174 on a second end 176 of the depositor body 120. As shown in FIG. 13, the second mating feature 174 is preferably a projecting feature of the depositor body 120. Preferably, the depth of the first mating feature 170 is defined by a radial surface 171. Referring to FIG. 13, the second mating feature 174 preferably has a surface 178. Preferably, the first end 172 and the second end 176 are opposite ends of the depositor body 120. In accordance with the present invention, the first mating feature 170 and the second mating feature 174 are used to assemble a plurality of depositor modules 18 in line, such as the depositor module 106 and the depositor module 108, as shown in FIG. 6. The depositor body end cap 150 preferably also includes such a second mating feature 174 and surface 178.

Referring to FIGS. 12 and 13, the depositor body 120 preferably includes an internal cavity 177 comprising a passage 180 and a shaping cavity 182. In accordance with the present invention the passage 180 preferably receives the sleeve 122 as described above and as is illustrated in FIG. 6. The sleeve 120 guides and functions as a bearing for the rotor 128 and may, in certain applications, function to improve thermal transfer as is described below.

Referring to FIG. 13, the internal cavity 177 of the depositor body 120 and the shaping cavity 182 are illustrated. In accordance with the present invention, the supply port 38 preferably opens directly into the shaping cavity 182 as can be seen in FIG. 13. The shaping cavity 182 is defined by a generally circular surface 184 that is preferably generally non-concentric with the rotor 128 when supported therein. The surface 184 also functions as a control surface for controlling and guiding the sliding vanes 134 and 136 as they rotate by the rotor 128. Preferably, shaping cavity 182 extends only partially around rotor 128 between rotor 128 and the supply port 38, such as can be seen in FIGS. 11 and 12. The shaping cavity 182 is further defined by a radially extending back surface 186 which surface defines a depth of the cavity 182. That is, the volume of the cavity 182 is partially defined by the surfaces 184 and 186, and the rotor 128. When assembled with another depositor body 120 or the depositor body end cap 150, surface 178 of mating feature 174 provides a radially extending front surface limiting the shaping cavity 182 as well and the combination of surfaces 184 and 186, the rotor 128, and surface 178 completely define the shaping cavity 182. Preferably, as described below, the depth of the shaping cavity 182 substantially corresponds to the length of a sliding vane, such as the sliding vane 134 or the sliding vane 136 shown in FIG. 10.

Referring to FIGS. 10 and 13, it is understood that the sleeve 122 may extend into the cavity 177 for improving thermal transfer. That is, the sleeve 122 may extend to cover a portion of the rotor 128 within the cavity 177. As such, the sleeve 122 functions as a bearing for the rotor 128 and also may function to remove frictionally generated heat from the rotor 128. Typically, heat that is frictionally generated by the rotation of the rotor 128 within the sleeve 122 may pass through the sleeve 122 to the body 120 to be dissipated. In the arrangement where the sleeve 122 extends such that it is within the cavity 177, thermal transfer may be improved. In such an arrangement, the sleeve may come into contact with food product that is within the cavity 177 and the heat may be transferred to the food product. Because food product is generally moving through the cavity 177, and especially at high speeds where frictionally generated heat may be increased, heat may be removed from the rotor at an increased rate.

As described above, the depositor body 120 preferably includes the passage 162 for the cutoff device 160. In FIG. 13 a cross-sectional view of the depositor body 120 is illustrated and the passage 162 is shown. Preferably, in accordance with the present invention, the passage 162 includes a dispensing port 188 for dispensing food product and is described in detail below. A passage 200 shown in dashed lines in FIG. 12 is also provided through the depositor body 120 to provide flowable food product communication between shaping cavity 182 and the passage 162. Then, when the cut off device 160 is inserted with its passage 161 aligned with both the passage 200 and the dispensing port 188, food product can be dispensed. When cutoff device 160 is rotated just enough for misalignment between passage 200 and its passage 161, no food product can be dispensed.

Further referring to FIG. 13, the depositor body 120 preferably includes a first mating feature 190 and a second mating feature 192, which function similarly to the mating features 170 and 174 described above. That is, where a plurality of depositor bodies are assembled in accordance with the present invention, the first mating features 170 and 190 of a first depositor body 120 align with and engage the second mating features 174 and 192 of a second depositor body 120. It is understood that the mating features 170, 178, 190, and 192 may simply comprise flat surfaces such as the surfaces 171 and 178 that are capable of mating and sealing respective depositor bodies together in accordance with the present invention or may comprise any corresponding mating surfaces, such as described above.

Figure 14:
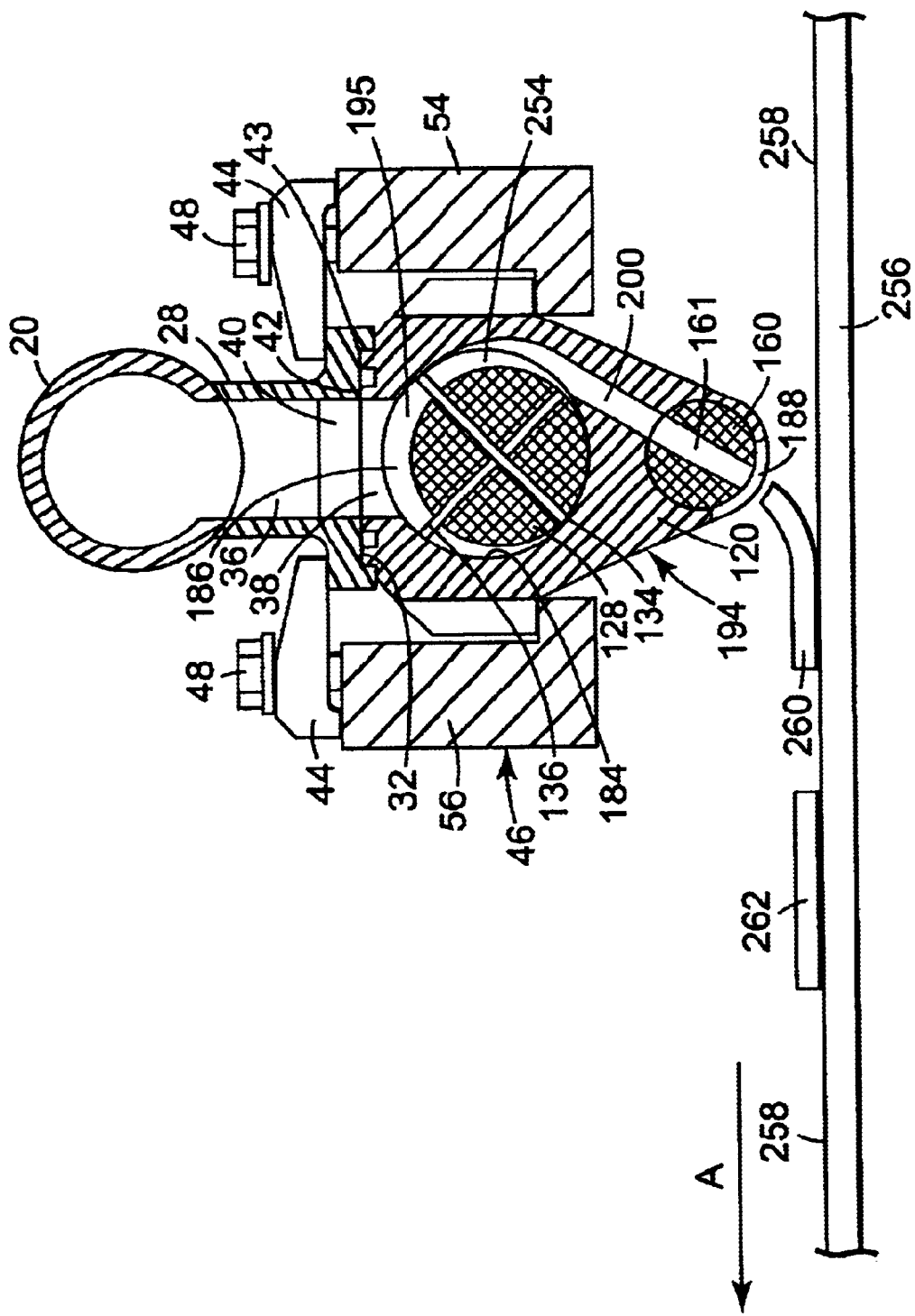
FIG. 14 is a cross-sectional view of a food product depositor module having a supply manifold and a distribution manifold operatively connected to a depositor body and operatively supported by a frame structure and in particular showing a sliding vane rotor assembly, and a cutoff device in accordance with the present invention and showing the food product depositor module positioned above a conveyor for receiving food product deposited by the depositor module.

Referring to FIG. 14, a partial cross sectional view of the food product depositor system of FIG. 1 is illustrated. Particularly, FIG. 14 shows a cross section of a depositor module 194 in accordance with the present invention. Also, FIG. 14, shows the depositor module 194 positioned above a conveyor 256 for receiving food product from the depositor module and which preferably moves in a machine direction A. Preferably, the conveyor provides a surface 258 for depositing food product thereon. It is understood that the surface 258 may be any surface such as a surface of another food product.

In FIG. 14, a portion of food product 260 is shown leaving the depositor module 194 (as described below) and depositing on the surface 258 and a deposited portion of food product 262 is shown carried by the conveyor. As illustrated, the side sections 54 and 56 of the frame 46 operatively support the depositor body 120. The supply manifold 20 is shown attached to the distribution manifold 28 as described above and as can also be seen in FIG. 1.

Further referring to FIG. 14, the bottom surface 32 of the distribution manifold 28 is in contact with the top surface 42 of the depositor body 120 and preferably a seal (not shown) such as an o-ring or the like is positioned in the seal groove 43 for providing a fluid tight seal between the distribution manifold 28 and the depositor body 120. It is understood that any fluid tight sealing technique may be used. As shown in FIG. 14, the mating port 40 of the distribution manifold 28 is preferably aligned with the supply port 38 of the depositor body 120. As can also be seen in FIG. 14, the distribution manifold 28 is securely held in position by the clamps 44 which are secured to the side sections 54 and 56 of the frame 46 by using bolts 48.

Further referring to FIG. 14, the depositor body 120 is illustrated with the rotor 128 positioned in the opening 180 (see FIG. 12) of the depositor body 120. Also shown in FIG. 14 are sliding vanes 134 and 136, which are positioned in the slots 130 and 132 (see FIG. 10) of the rotor 128. Surface 184 controls the interaction of sliding vanes 134 and 136 as rotor 128 is rotated. Further, in accordance with the present invention the tips of the sliding vanes 134 and 136 sealingly contact the surface 184. Also preferably, at least the portion of the sides of the sliding vanes 134 and 136 that extend past the outside surface of the rotor 128 sealingly contact the surfaces 186 and 178 accordingly. As such, sliding vanes 134 and 136 may capture food product between the sliding vanes 134 and 136 and move food product through the portion of the cavity 182 (refer to FIG. 13) that comprises a chamber 195 and a region 254, and also a passage 200 under the rotation of the rotor 128. Thus, the chamber 195, region 254, and passage 200 form the total region that food product moves through. Additionally, if used, passage 161 of the cutoff device 160 forms a part of the region that food product moves through. As described below, change in the cross-sectional shape of the region that food product moves through (such as the region made up of chamber 195, region 254, passage 200, and passage 161 as illustrated in FIG. 14) is preferably minimized.

As can be seen in FIG. 14 the chamber 195 is defined by the outside surface of the rotor 128, the surface 184, and the portions of the sliding vanes 134 and 136 that extend beyond the outside surface of the rotor 128. As mentioned above, the tips of the sliding vanes 134 and 136 preferably sealingly contact the surface 184 to form the chamber 195. The chamber 195 is further defined by the surface 186 (which can also be seen in FIGS. 12 and 13) and by the surface 178 of the mating feature 174 of the depositor body 120. Also, as described above the sides of the sliding vanes 134 and 136 preferably sealingly contact the surfaces 186 and 178. As such, the area generally defined by the portions of the sliding vanes 134 and 136 that extend past the outside surface of the rotor 128 generally corresponds to and defines the cross-sectional shape of the food product within the chamber 195. As can be seen in FIG. 14, such sliding vane extension is generally the maximum extension of a sliding vane for the exemplary embodiment shown in FIG. 14. Preferably, as can be seen in FIG. 14, the maximum extension of the sliding vane begins at a rotational position where the vane is just before the port 38. Thus, in accordance with one aspect of the present invention, the chamber 195 preferably defines the shape of the food product to be dispensed such that the cross-sectional shape of the food product is not thereafter restricted by reshaping and preferably, it remains substantially constant as the food product moves through the chamber 195 and the passage 200. Additionally, it is noted that, chamber 195 comprises a volume less than that of the total cavity 182.

As above, the depositor body 120 preferably includes the passage 200 the purpose of which is to allow food product to pass through the depositor body 120 and be dispensed through the dispensing port 188 of the depositor body 120. The food product that has been cross-sectionally shaped within chamber 195 is forced by rotation of the rotor 128 and vanes 134 and 136 from cavity 182 through passage 200 (and through passage 161 when a cutoff device is used) and ultimately from dispensing port 188 when cutoff passage 161 is aligned (when used). Preferably, the cross-sectional shape of the passage 200 (and the passage 161 when used) generally corresponds to the cross-sectional shape of the chamber 194 which itself preferably corresponds to the cross-sectional shape of the portion of the sliding vanes 134 and 136 that extends past the outside surface of the rotor 128. Thus, the cross-sectional shape of the food product generally corresponds to the cross-sectional shape of the portion of the sliding vanes 134 and 136 that extends past the outside surface of the rotor 128.

In accordance with one aspect of the present invention, it is desirable to minimize any reshaping of the cross-sectional shape of the food product once the food product is supplied to the chamber 195. In chamber 195, the cross-sectional shape is first defined. By not reshaping the cross-sectional thereafter, in particular by restriction (such as reducing its size or changing its shape is a way to restrict its movement forward), energy conservation and/or processing speed can be improved. Expansion of the food product's cross-sectional shape or expansion reshaping may be permitted in accordance with this aspect of the present invention, since such action would not create added resistance or restriction to the flow of food product forward. It is preferably, however, that reshaping be minimized throughout all further food product travel for improved product flow dynamics.

In operation food product enters the cavity 182 through port 38. Preferably, the food product is under sufficient pressure to continuously fill the chamber 195 as the rotor 128 rotates the sliding vanes 134 and 136 thereby forcing food product towards the passage 200. As described above, the tips and sides of the sliding vanes 134 and 136 preferably sealingly engage the surfaces 184, 186, and 178. Such sealing preferably prevents leakage and also preferably allows for sufficient pressure to move food product through the cavity 182, out an exit of the cavity 182, and through the passage 200. As a sliding vane forces food product towards the passage 200, change in the cross-sectional shape of the food product is advantageously minimized because, as described above, the cross-sectional shape of the chamber 195, the region 254, the passage 200, and the passage 161 (when a cutoff device is used) are substantially similar thereby minimizing changes in the cross-sectional shape of food product as it is forced through the depositor body 120. Such minimized change to the cross-sectional shape of the food product flow stream is advantageous in that it provides for lower rotational power requirements such as for highly viscous materials and especially for materials that are dilatant in their rheological characteristics. As an additional advantage minimized cross-sectional change to the flow stream allows for rapid and highly controlled acceleration and deceleration of the rotor and sliding vanes which provides for greater control over deposited food products. Moreover, greater processing speeds may be realized where changes to the cross-sectional shape of the fluid stream are minimized. As an further advantage, damage to food product particulates such as those particulates described above, may be reduced where changes to the cross-sectional shape of the fluid stream are minimized. Also, the food product may be shaped within the depositor body such that no additional shaping of the deposited food product is required. As a result of minimizing changes to the cross-sectional shape of the fluid stream, the food product depositor of the present invention may be operated in excess of 220 cycles per minute for a viscous food product such as the food products discussed above. Such processing rates are superior to those realized by other sliding-vane type depositors.

In FIG. 14 the cutoff device 160 and the passage 161 are also illustrated in cross section. As described below, the cutoff device 161 may be used to assist in separating units of food product being dispensed from the depositor, module by rotating the cutoff device such that the cutoff device 160 effectively opens and closes the passage 200. It is noted that the cutoff device may be used for food product materials having particular rheological characteristics. That is, food products such as icings and the like may have a generally low viscosity and may be difficult to separate into individual units without the use of the cutoff device 160. However, it is understood that the rotor 128 may be rotated slightly backwards immediately after rotating forwards to perform a deposit of food product thereby sucking back the food product to act as a cutoff of the food product. It is understood that food products such as scrambled eggs and the like may have a generally high viscosity and rheological characteristics such that the food product may be deposited in individual units with or without such a cutoff device as described below.

A method in accordance with the present invention of dispensing food product using the above-described apparatus is as follows. Preferably, a multilane food product depositor system such as the system shown in FIG. 1 is positioned above a food product receiving conveyor 256 which preferably moves in a machine direction A (See FIG. 14). A food product supply (not shown) is preferably attached to at least one of the feed ports 22, 24, and 26 of the supply manifold 20 for delivering food product to the supply manifold 20. Preferably, the food product passes through the conical openings 36 of the distribution manifold 28 shown in FIGS. 3–5. The food product may then pass through the mating ports 40 of the distribution manifold 28 such that it is delivered to the supply ports 38 of the individual depositor modules 18 shown in FIG. 2.

As can be seen in FIG. 14 food product entering a depositor module, such as the depositor module 194 of FIG. 14, passes through the supply port 38 and preferably fills the chamber 195 when the rotor 128 is positioned as shown. The rotor 128 may then be rotated in a generally clockwise motion (as viewed in FIG. 14) by the motor 118 and gearbox 114 shown in FIG. 1. Preferably, the motor 118 is controlled by the control system (not shown). In a preferred embodiment, the rotor 128 is rotated by an angular amount generally corresponding to a desired amount of food product to be dispensed from the depositor. In one aspect of the present invention, the rotation of the rotor may generally correspond to the angular separation between the sliding vanes 134 and 136. That is, for the arrangement illustrated in FIG. 14, the rotor may be rotated by about 90 degree increments. It is understood that any number of sliding vanes may be utilized and there need not be correlation between the number of vanes and the degree of rotation. For example, three sliding vanes may be utilized with any degree of rotation. Use of additional sliding vanes may provide a smaller region where food product is trapped. Also, more seals between the supply port and discharge port generally provide for better control of pressure for moving food product through the depositor module.

Further referring to FIG. 14, as the rotor 128 rotates, either incrementally or continuously, the sliding vanes 134 and 136 move the food product material that has been supplied within the chamber 195 in a direction generally towards the port 188. Also, food product contained within the region 254, the passage 200, and the passage 161 (if used) is moved simultaneously towards the port 188. Preferably, as described above, changes to the cross-sectional shape of the food product are minimized during such movement. Generally, for each move of the rotor 128, at least part of a newly formed empty chamber 195 may be thereby provided to be filled with food product material from the supply port 38. Preferably, the rotor 128 is rotated by a motor, which motor preferably includes a control system such as a logic based computer control system or the like for controlling velocity, rotational position of the rotor and sliding vanes, as well as portion and shape control of the deposited food product. Preferably, for some food product materials, at least some of the food product material defined by the chamber 195 may be moved from the chamber 195 to the region 254 by rotating the rotor 128 by a single predetermined rotational increment generally corresponding to a desired amount of food product to be dispensed through the dispensing port 188. As such, increments of food product are also moved from the region 254 to the passage 200 and from the passage 200 to the passage 161 if the passage 161 is used. Such rotation may advantageously be controlled by using the control system to rotate the rotor by such predetermined increment. Such use of the control system is advantageous in that greater precision in controlling the amount of food product deposited may be obtained. An additional rotation of the rotor 128 by a single predetermined rotational increment, which increment may be the same as the previous increment or may be different from the previous rotational increment, may then dispense a desired amount of food product through the dispensing port 188. It is understood that the rotor may also be rotated continuously to deposit a continuous stream of food product.

In accordance with the present invention the cutoff device 160 may be used to assist in defining individual units of food product material dispensed from the depositor device. The cutoff device 160 may advantageously be used to not only control food product flow, but also to cleanly cut through particulates within the food product such as chunks of meats and vegetables and the like. Referring to FIG. 14, the depositor device is positioned such that the passage 161 is aligned with the dispensing passage 200 of the depositor body 120. That is, food product may pass from the dispensing passage 200 through the passage 161 of the cutoff device 160 and be dispensed through the dispensing port 188 without interruption. Referring to FIGS. 1, 2, and 6, the cutoff device 160 is preferably driven by the motor 166 which is preferably controlled by the control system (not shown). In one aspect of the present invention, the cutoff device may be rotated either clockwise or counterclockwise so as to interrupt the passage of food product material and thereby define an individual unit of food product material. That is, the cutoff device 160 may be rotated back and forth. In such motion the cutoff action takes place as the passage 161 is rotated so it is misaligned with passage 200. Once cutoff has taken place the passage 161 is preferably rotated in the opposite direction so it returns to alignment with passage 200. Such back and forth rotation of the cutoff device is advantageous in that it provides for greater speed of operation generally because the passage 161 only needs to be rotated by a small amount to perform the cutoff. The passage 161 may then quickly rotate back into alignment with passage 200 because it does not need to rotate 180 degrees to the opposite side of the passage 161. In another aspect of the present invention, it is understood that the cutoff device 160 may be continuously rotated in one direction and timed with the rotation of the rotor 128.

Figure 15:
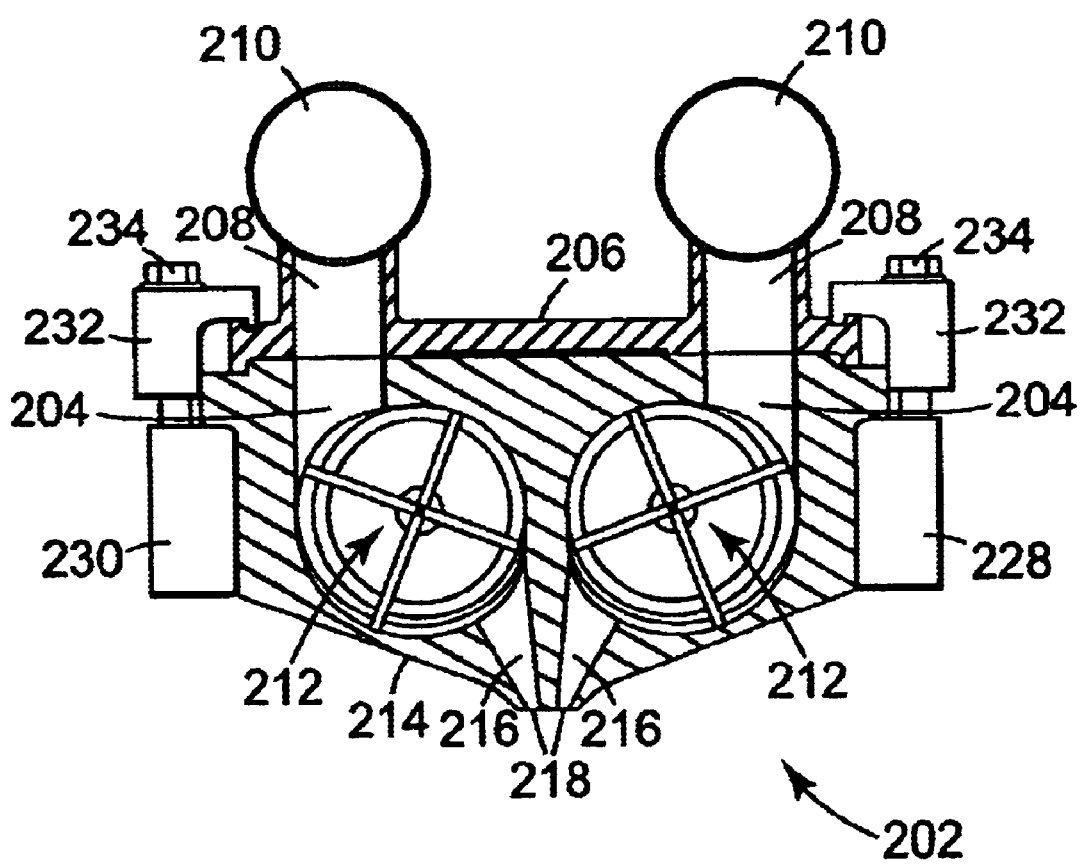
FIG. 15 is a cross-sectional view of a food product depositor module in accordance with the present invention having a pair of sliding vane rotor assemblies for dispensing food product through individual dispensing ports.
Figure 16:
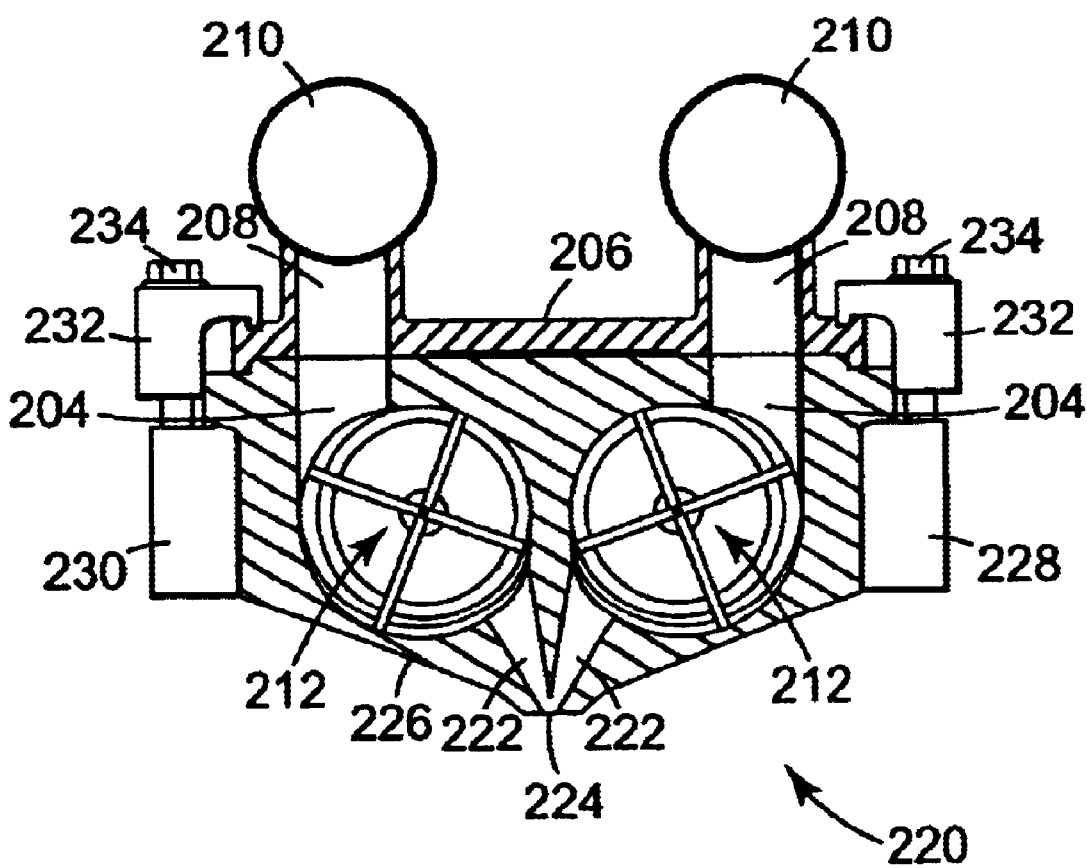
FIG. 16 is a cross-sectional view of a food product depositor module in accordance with the present invention having a pair of sliding vane rotor assemblies for dispensing food product through a common dispensing port.
Figure 17:
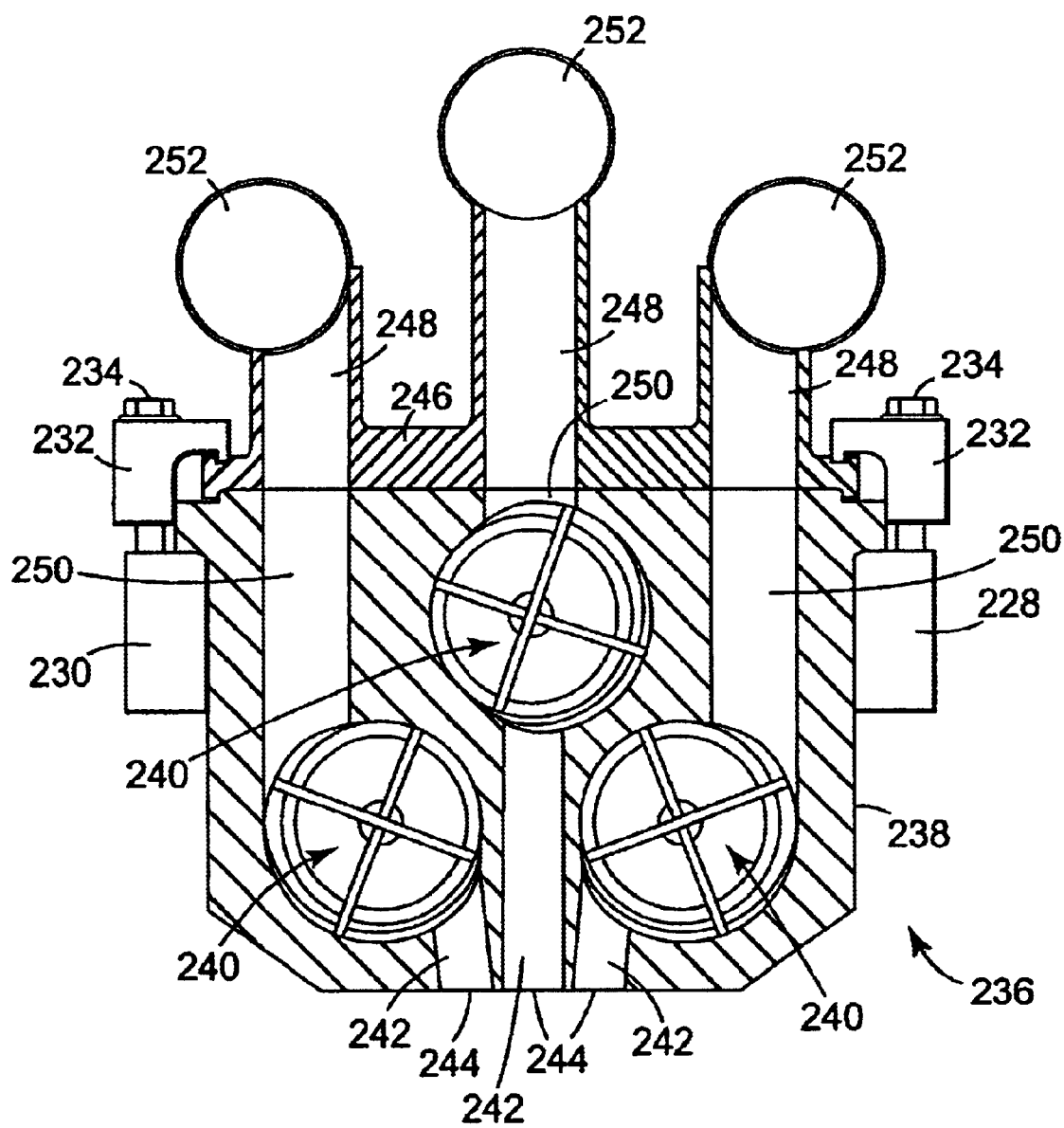
FIG. 17 is a cross-sectional view of yet another food product depositor module in accordance with the present invention having a plurality of sliding vane rotor assemblies for dispensing food product through individual dispensing ports.

It is understood that the food product depositor module of the present invention is not limited to the food product depositor module 195 illustrated in FIG. 14. Several exemplary embodiments of other food product depositor modules of the present invention are illustrated in FIGS. 15, 16, and 17 as operatively supported by frame sections 228 and 230 and are preferably secured by clamps 232 and bolts 234 as described above in accordance with the present invention. In FIG. 15 a cross-sectional view of a food product depositor module 202 is shown. The depositor module 202 includes a pair of supply ports 204 which are preferably fed by a distribution manifold 206 having multiple passages 208 fluidly connected to a pair of supply manifolds 210. The depositor module 202 shown in FIG. 15 also preferably includes a pair of sliding vane rotor assemblies 212 which are positioned within a depositor body 214 in accordance with the present invention. It is understood that the depositor body 214 may include any number of sliding vane rotor assemblies 212 such that the functional aspects of the present invention are accomplished. Further referring to FIG. 15, the depositor body 214 of the depositor module 202 preferably includes a pair of dispensing passages 216 which include dispensing ports 218. It is understood that the passages 216 as well as the passages 222 of the depositor body 202 shown in FIG. 16 and the passages 244 and 242 of the depositor body 220 shown in FIG. 17 and any others provided, may be formed to minimize restricting changes to the cross-sectional shape of the fluid stream. In accordance with one preferred aspect of the present invention, described above, one or more passages may be formed with changing cross-sectional shapes of the food product that is moved through them, such as illustrated in FIGS. 15, 16, and 17. That is, for some applications minimizing changes to the fluid stream may not be required, such as where product speeds are low or less viscous materials are deposited. In FIG. 16 an exemplary variation of the depositor module 202 shown in FIG. 15 is illustrated. In the depositor module 220 of FIG. 16 a pair of dispensing passages 222 of a depositor body 226 are shown which converge at a common dispensing port 224.

In FIG. 17 another exemplary food product depositor module 236 is illustrated in cross section. The food product depositor module 236 preferably includes a depositor body 238 which has a plurality of sliding vane rotor assemblies 240 positioned within the depositor body 238 as described above and in accordance with the present invention. Further referring to FIG. 17 the depositor body 238 includes a plurality of dispensing passages 242 which have dispensing ports 244. The food product depositor module 236 may also include a distribution manifold 246 having passages 248 fluidly connected to supply ports 250 of the depositor body 238. Also, the depositor module 236 includes a plurality of supply manifolds 252 in accordance with the present invention. It is understood that a distribution manifold 246 may have any number of passages 248 such that the functional aspects of the present invention are accomplished. Further, it is understood that any number of supply manifolds 252 may be utilized in conjunction with the distribution manifold 246. That is, a common supply manifold may be used to feed multiple passages of a single distribution manifold or multiple distribution manifolds.

It is understood that the exemplary depositors illustrated in FIGS. 15, 16, and 17 may be utilized to perform a wide range of deposition processes. Each of the independent rotors may deposit the same or different food products at any rate or quantity thereof. For example, the food product depositor module 202 may be utilized to deposit a different food product by each of the rotors 212, passages 216, and ports 218 or the same food product. The individual rotors 212 may be rotated intermittently, either synchronously or independently intermittent, or continuously at the same or different rates.

In accordance with the present invention, a second depositor device having any number of depositor modules may be placed downstream of a first depositor device. Such an arrangement may be utilized to deposit layered food products, for example, or to deposit fillings or coatings or any other additional food products. The food products can be deposited one on top of another, or in an adjacent configuration to the initial deposit, creating a longer deposit or adding aesthetic elements to the deposit. Also, in accordance with the present invention, an additional depositor device placed downstream of a first depositor device may be used to deposit an additional amount of food product on a first deposit of food product to create a total deposit in compliance with a predetermined weight specification. That is, food product may be added to an underweight deposit that has been deposited by a first depositor device by use of a second depositor device. In such a process, a first deposit could be weighed, a computer could calculate any deficiency, and a signal could be sent to a control system of a second depositor device and an appropriate amount of food product could be deposited to add to the first deposit. An example of such a technique is disclosed in U.S. Pat. No. 5,073,391 to DeMars et al., and entitled "Semi-Solid Food Depositor and Method of Use," and which is commonly assigned to the assignee of the present invention and the disclosure of which is entirely incorporated herein by reference.

In accordance with a further aspect of the present invention, the shape of the food deposit, such as length and the width profile of the product, can be controlled by manipulating the speed of the rotor motion profile with respect to the speed of the conveyor 256. The speed of the rotor 128 and conveyor 256 is computer controlled and is used to manipulate the processing speed of the operation and changes can be made "on the fly" when required to change the product due to modifications needed for distribution. Alternatively, the shape of the deposit can be changed by modifying the motion profile of the rotor 128.

The present invention is not limited to the above described preferred apparatus and methods. Furthermore, it should be understood that, while particular embodiments of the invention have been discussed, this invention is not limited thereto as modifications may be made by those skilled in the art, particularly in light of the foregoing teachings. Accordingly, the appended claims contemplate coverage of any such modifications as incorporate the essential features of these improvements within the true spirit and scope of the invention.

What is claimed is:

1. A food product depositor module for use in a multi-lane depositor system with another food product depositor module having similar features, the depositor module comprising:

a first depositor body having a first mating feature at a first end of the depositor body and a second mating feature at a second end of the depositor body, the second mating feature for mating with a first mating feature of another depositor module similar to the first depositor module;

a rotor rotatably positioned and supported within a chamber of the body and having at least one sliding vane passing through the rotor;

a supply port fluidly connected to the chamber;

a discharge port fluidly connected to the chamber; and a shaping region positioned between the supply port and the discharge port.

2. The depositor module of claim 1, wherein the rotor includes a first mating feature at a first end of the rotor and a second mating feature at a second end of the rotor wherein the first and second ends of the rotor are opposite ends of the rotor.

3. The depositor module of claim 2, wherein the first mating feature of the rotor is a recessed feature of the rotor and the second mating feature of the rotor is a projecting feature of the rotor capable of being slidably received by a first mating feature of a similar rotor.

4. The depositor module of claim 1, wherein the first mating feature of the depositor body is a recessed feature of the depositor body and the second mating feature of the depositor body is a projecting feature of the depositor body capable of being slidably received by a first mating feature of a similar depositor body.

5. The depositor module of claim 1, wherein the first mating feature of the depositor body comprising a first substantially flat surface of the depositor body and the second mating feature of the depositor body comprises a second substantially flat surface of the depositor body that is capable of engagement with a first surface of a similar depositor module.

6. The depositor module of claim 1, wherein the shaping region is at least partially defined by the chamber and the rotor.

7. The depositor module of claim 6, wherein the depositor body includes a passage that provides fluid communication between the chamber and the discharge port.

8. The depositor module of claim 7, wherein the cross-sectional shape of the shaping region and the cross-sectional shape of the passage are substantially the same.

9. The depositor module of claim 8, wherein the depositor module includes a cutoff device operatively disposed relative to the discharge port.

10. The depositor module of claim 9, wherein the cutoff device comprises a movable cutting element that is operatively supplied to the depositor module to move across the passage.

11. The depositor module of claim 10, wherein the cutoff device comprises a rotary spool device rotatably positioned within the passage before the discharge port.

12. The depositor module of claim 11, wherein the rotary spool device includes a passage capable of selectively providing fluid communication from the passage to the discharge port.

13. The depositor module of claim 12, wherein the passage of the rotary spool device has a cross-sectional shape similar to the cross-sectional shape of the shaping region and the passage of the depositor body.

14. A depositor module for depositing food product, the depositor module comprising:
    a depositor body having an internal chamber, the internal chamber having an inside surface;
    a rotor rotatably positioned and supported within the internal chamber of the depositor body, the rotor having an outside surface;
    at least one sliding vane passing through the rotor, the rotor having a rotational position wherein a portion of a sliding vane extends past the outside surface of the rotor into the chamber, and wherein the sliding vane extension is at least partially determined by the inside surface of the internal chamber;
    a supply port fluidly connected to the internal chamber;
    a discharge port fluidly connected to the internal chamber; and
    a shaping region positioned between the supply port and the discharge port, the shaping region being defined by at least a portion of the outside surface of the rotor and at least a portion of the inside surface of the chamber and wherein the cross-sectional shape of the shaping region generally corresponds to the portion of the sliding vane extending past the outside surface of the rotor between a first rotary position of the rotor and sliding vane and a second rotary position of the rotor and sliding vane.

15. The depositor module of claim 14, wherein the first rotary position of the rotor and sliding vane is a rotary position wherein a sliding vane is before but proximal to the supply port.

16. The depositor module of claim 15, wherein the second rotary position of the rotor and sliding vane is a rotary position wherein a sliding vane is after but proximal to an exit of the shaping region.

17. The depositor module of claim 14, wherein the depositor body further includes a passage that provides fluid communication between the chamber and the discharge port.

18. The depositor module of claim 17, wherein the cross-sectional shape of the shaping region and the cross-sectional shape of the passage are substantially the same.

19. The depositor module of claim 18, wherein the depositor module includes a cutoff device operatively disposed relative to the discharge port.

20. The depositor module of claim 19, wherein the cutoff device comprises a movable cutting element that is operatively supplied to the depositor module to move across the passage.

21. The depositor module of claim 20, wherein the cutoff device comprises a rotary spool device rotatably positioned within the passage before the discharge port.

22. The depositor module of claim 21, wherein the rotary spool device includes a passage capable of selectively providing fluid communication from the passage to the discharge port.

23. The depositor module of claim 22, wherein the passage of the cutoff device has a cross-sectional shape similar to the cross-sectional shape of the shaping region and the passage of the depositor body.

24. The depositor module of claim 14, wherein the portion of the sliding vane extending past the outside surface of the rotor generally corresponds to the cross-sectional shape of the food product deposited from the depositor module.

25. A method of depositing a predetermined amount of viscous food product comprising the steps of:
    providing at least one food product depositor module, the depositor module comprising a depositor body having a rotor with at least one sliding vane rotatably supported within an internal chamber thereof;
    supplying viscous food product to a supply port of the food product depositor module and thereby filling at least a portion of a shaping region defined within the depositor module at least in part by the rotor and its internal chamber;
    transferring food product through the shaping region by rotating the rotor and sliding vane without substantially restrictive reshaping of the cross-sectional shape of the food product; and
    depositing the predetermined amount of food product through a discharge port fluidly connected to the chamber.

26. The method of claim 25, wherein the rotor is rotated continuously in the transferring step thereby depositing a continuous stream of food product.

27. The method of claim 25, wherein the rotor is rotated in the transferring step by a rotational amount generally corresponding to the predetermined amount of food product to be deposited.

28. The method of claim 25, further comprising the step of transferring food product from the supply port to an exit of the shaping chamber by rotating the rotor and sliding vane.

29. The method of claim 28, further comprising the step of transferring food product from the exit of the shaping chamber to the discharge port by rotating the rotor and sliding vane.

30. The method of claim 25, further comprising the step of cutting off the food product as the food product is deposited through the discharge port.

31. The method of claim 30, wherein the cutting off step is performed by rotating a spool type cutoff device within a passage within the depositor body.

32. The method of claim 25, further comprising the step of providing a second food product depositor module downstream from the first food product depositor module.

33. The method of claim 32, wherein the second food product depositor module supplements the food product by depositing a further amount of food product through a discharge port.

* * * * *